United States Patent [19]

Di Russo et al.

[11] 4,426,429
[45] Jan. 17, 1984

[54] ALUMINIUM ALLOYS COMPOSITE PLATES

[75] Inventors: Ettore Di Russo; Massimo Buratti; Silvano Veronelli, all of Novara, Italy

[73] Assignee: Alluminio Italia S.p.A., Portoscuso, Italy

[21] Appl. No.: 328,655

[22] Filed: Dec. 8, 1981

[30] Foreign Application Priority Data

Apr. 15, 1981 [IT] Italy .................. 21206 A/81

[51] Int. Cl.³ .......................... B32B 15/20
[52] U.S. Cl. .................. 428/654; 89/36 A; 89/36 H
[58] Field of Search .............. 428/654; 89/36 A, 36 H

[56] References Cited

U.S. PATENT DOCUMENTS

| | | | |
|---|---|---|---|
| 2,376,681 | 5/1945 | Gauthier | 428/654 |
| 2,821,014 | 1/1958 | Miller | 428/654 |
| 3,042,555 | 7/1962 | George et al. | 89/36 A |
| 3,824,083 | 7/1974 | Fritzler | 428/654 |
| 3,881,883 | 5/1975 | Fritzlen | 428/654 |
| 3,962,976 | 6/1976 | Kelsey | 89/36 A |
| 4,161,125 | 7/1979 | Degnan | 89/36 A |

FOREIGN PATENT DOCUMENTS

| | | | |
|---|---|---|---|
| 618129 | 4/1961 | Canada | 428/654 |
| 625094 | 6/1949 | United Kingdom . | |

OTHER PUBLICATIONS

*1978 Data Book,* Metal Progress, pp. 86, 88, 89.
Military Applications of Aluminium, by Berbard Trock, pp. 263-265, 1972 Meeting of Institute of Metals held in Zurich, Switzerland (6/72).
Use of Aluminium in Armoured Military Vehicles, by F. J. Reker, Klobenz—Aluminium 1977, 53 (7), 421-426.

*Primary Examiner*—Michael L. Lewis
*Attorney, Agent, or Firm*—Karl F. Ross; Herbert Dubno

[57] ABSTRACT

A composite plate formed of aluminium alloys, having high characteristics of resistance to dynamic penetration by hard bodies, comprising three "components" which reciprocally contact one another in a superimposed position and are welded on their respective contact surfaces, the "central" component possessing very high mechanical strength and hardness properties, while the other two components (respectively "front" and "inner" components) possess high toughness and good weldability properties.

Said three "central", "front" and "inner" components have a tensile strength respectively comprised in the following ranges: from 540 to 735 N/mm², from 345 to 540 N/mm² and from 290 to 520 N/mm², and a thickness respectively comprised between the following percent values in respect of the total thickness of the composite plate: 35-62%, 19-32.5% and 19-32.5%.

4 Claims, 1 Drawing Figure

ALUMINIUM ALLOYS COMPOSITE PLATES

ALUMINIUM ALLOYS COMPOSITE PLATES

This invention relates to aluminium alloy composite plates having high characteristics of resistance to dynamic penetration by hard bodies—in particular by conventional and armor-piercing projectiles and by spalls of disruptive projectiles—and high properties of resistance to spalling.

BACKGROUND OF THE INVENTION

In the present description the aluminum alloys will be designated by the known international items of "Aluminium Association" ("Registration record of international alloy designations and chemical composition limits for wrought aluminium alloys"), and the chemical compositions of said alloys will be expressed (using known chemical symbols) by indicating the amounts of alloying elements in percent (%) by weight, being understood that the balance to 100% is represented by aluminium. Alloys containing an aluminium amount higher than 80% are to be considered as aluminium alloys.

It is known that in the construction of civil and military armored vehicles a very important role is played by the aluminium alloys having compositions specifically suitable for the manufacture of armor plates endowed with a high resistance to penetration by projectiles and to spalling.

During the second world war, alloy 2024-T4 of the Al-Cu-Mg series (4.5% Cu, 1.5% Mg, 0.6% Mn) was widely employed in the form of low thickness sheets as material for armor for protecting the pilots of the fighters and bombers. At that time the armor of the troop transport cars and of the combat cars was made exclusively of steel. Plates of great thickness made of light alloy, which would have been necessary for these uses, were used exclusively in the aircraft industry.

Ballistic tests performed in the U.S.A. at the beginning of the second world war (Trook B., "Military Applications of Aluminium", Metals Mater., VI, pages 263-265, June 1972), had proved how the use of aluminium alloys made it potentially possible to reduce by 28% the weight in respect of the use of a common steel for armors RH (with not hardened surface), if the ballistic properties of 19 mm thick plates of 2024-T4—known at that time—could be transferred to plates of the same alloy with a higher thickness (the parameters relating to the "ballistic properties" will be better defined hereinafter).

Successively, the ballistic behavior of plates obtained with other aluminium alloys (besides with said alloy 2024) having thicknesses varying from 38 to 102 mm, was studied comparing it with the behavior of a steel for armor RH. Weights being equal, the aluminium alloys exhibited a better behavior, as compared with said steel, to the projectiles of little firearms and to the spalls of disruptive projectiles, but the plates of greater thickness showed a brittle behavior to the projectiles of larger caliber. At that time, however, weldable aluminium alloys having mechanical resistance characteristics equivalent to the ones of the alloys experimentally tested were not available on a commercial scale. The interest for the aluminium alloys as materials capable of replacing steel in the armored vehicles rapidly dropped as a consequence.

Problems of military strategy arose during the Korean war and involved the necessity of having at disposal light air-transportable and parachutable armored vehicles. Therefore a new interest was directed to the light alloys and particularly to the alloys having a high mechanical strength such as the types 7075 (5.6% Zn, 2.5% Mg, 1.6% Cu, 0.22% Cr), 2024 and 2014 (4.4% Cu, 0.8% Si, 0.4% Mg, 0.8% Mn).

The physical-mechanical and ballistic characteristics of these alloys (the production technology thereof had undergone meanwhile a constant progressive improvement as compared with their first appearance rendered them potentially suitable for armors; furthermore, the relevant plate thickness necessary to provide the required ballistic protection were such as to ensure a sufficient structural rigidity to the armored vehicle without having to use ribs or any additional supporting structural elements.

In this manner the original main object was of course achieved, namely a reduction in the vehicle weight; a lowering in the production costs was attained too. However, the above-mentioned alloys exhibited considerable technological limitations consisting, on one side, in their low weldability and, on the other side, in the excessive degradation of their mechanical properties at the welded joints along with a marked tendency to spalling especially in the case of the higher plate thickness. On the other hand, the assembly by means of riveting could not be allowed as the rivets may become just secondary projectiles when they are hit by a projectile or by projectile spalls.

It was then necessary to have recourse to weldable and less brittle aluminium alloys: the choice fell on binary alloys Al-Mg which, besides excellent weldability characteristics, high toughness and corrosion resistance properties and medium strength characteristics, exhibited sufficient ballistic properties.

These alloys—belonging to type 5083 (4.5% Mg, 0.7% Mn, 0.15% Cr)—have constituted for a certain period of time (in the known "H115 temper") the only light material utilized in the armored vehicles for troops transportation; their most important application occurred in tracked vehicle M-113, designed and developed in U.S.A. by Food Machinery Corp. (San Jòse, Calif.).

The use of aluminium alloys was taken into consideration also when the idea of constructing the air-transportable amphibian assault tank M 55I equipped with a steel turret and with a light alloy hull was carried into effect in the U.S.A.

In relation to these utilizations it appeared then necessary to obtain weldable aluminium alloys with ballistic properties superior to the ones of the Al-Mg alloys.

Thus, ternary alloys Al-Zn-Mg, studied and developed in Europe and U.S.A. simultaneously began to be used.

In respect to the Al-Mg alloys, the Al-An-Mg alloys—the application of which in the construction of hulls for armored vehicles has been extending more and more in the last years—result more easily hot workable, do not require (since they are heat-treatable alloys) any final cold deformation to increase the mechanical strength (what is necessary, conversely, for the Al-Mg alloys) and exhibit, for certain Zn and Mg contents, higher values of mechanical strength, chiefly in the welded manufactured articles in relation to the possibility of recovering, to a considerable extent, merely by natural aging, the mechanical characteristics worsened in consequence of the welding heating. Said alloys exhibit also better fatigue strength and, as already mentioned, higher ballistic properties than the Al-Mg alloys.

A wider application in the field in question have found Other suitable alloys include and 7005 (4.5% Zn, 1.4% Mg, 0.13% Cr, 0.45% Mn, 0.14% Zr) in U.S.A. alloy 7020 (4.5% Zn, 1.2% Mg, +Cr, +Mn, +Zr, similar to U.S.A. type 7005) in Europe and—limitedly in the United Kingdom—alloy 7017 (5.0% Zn, 2.5% Mg, 0.13% Cu, 0.15% Cr, 0.3% Mn, 0.15% Zr, similar to alloy 7039, in respect of which alloy 7017 exhibits a slightly higher mechanical strength).

Alloy 7039 provides, among the Al-Zn-Mg alloys and for certain plate thicknesses, one of the best combinations of resistance to penetration (such property being essentially bound to the tensile characteristics and to the hardness of the material) and of resistance to spalling (such property being bound to the material toughness).

For some applications, however, the use of alloy 7039 has not proved thoroughly satisfactory due to the not high ballistic resistance to the conventional and armor-piercing projectiles which hit the plate at angles approximately from 30° to 55° in respect of a line normal to the plate surface. For angles comprised in said range, the high-hardness steel for armors IT80 shows a higher ballistic resistance, on equivalent weight basis (weight per unit area) (REKER F. J., "Anwendung von Aluminium bei gepanzerten Militärfahrzeugen". Aluminium, LIII, pages 421-426, July 1977). Furthermore, for high thicknesses, the plates made of alloy 7039 exhibit tendency to spalling.

Aluminium alloys with mechanical strength and hardness characteristics higher than the ones of the previously cited Al-Zn-Mg alloy generally exhibit, as mentioned hereinbefore, an excessive tendency to spalling, independently of the plate thickness.

H. P. George and H. W. Euker ("Impact Resistant Aluminium Alloy Plate", U.S. Pat. No. 3,042,555, July 3, 1962), say that it is possible to overcome the problem of spalling by overageing the inner surface (opposite to the projectile impact surface) of plates made of Al-Zn-Mg-Cu alloys 7075 and 7178 (6.8% Zn, 2.7% Mg, 2% Cu, 0.22% Cr). Such a process, however, is very difficult to control, and although the plate obtained exhibits an improved resistance to spalling, such improved property is achieved to the detriment of the resistance to penetration.

M. C. Fetzer, J. D. Sprowl and W. R. Mohondro ("Aluminium Composite", U.S. Pat. No. 3,649,227, Mar. 14, 1972) state that the problem of increasing the resistance to penetration by armor-piercing projectiles and the resistance to disruptive projectile splits whilst simultaneously attaining a good resistance to spalling (comparable to or higher than the one of alloy 7039) can be solved by means of composite plates consisting of two layers "welded" to each other by hot rolling, the outer layer ("front") being made of an aluminium alloy endowed with higher mechanical resistance and hardness characteristics than the ones of alloy 7039, the inner layer being made of an alloy having a lower mechanical resistance than the alloy of the outer layer, but tougher; the composite plate is characterized also in that the thickness of the inner layer ranges from 4 to 20% (preferably from 5 to 12%) of the total thickness of said composite plate. The outer ("front") layer and the inner layer are separated respectively from alloys having a tensile strength of 446-618 N/mm$^2$ and 309-480 N/mm$^2$ (Newton/mm$^2$) respectively.

Said patent discloses the utilization, for the front layer, of an alloy of series 7000 (containing also copper up to 3%, such as for example types 7075 and 7178), preferably of the alloy containing 6.6% Zn, 2.5% Mg, 0.15% Cu (+Mn, +Cr, +Zr, +Ti), and for the inner layer the utilization of an alloy also of type Al-Zn-Mg (with up to 3% of copper), preferably of the alloy containing 4.5% Zn, 0.75% Mg, 0.15% Cu (+Cr, +Mn, +Zr, +Ti); it is an essential condition that the inner layer should have a tensile strength lower than the one of the front layer by at least 15 N/mm$^2$, preferably by 49 N/mm$^2$.

The composite plate according to the aforesaid patent exhibits undoubtedly a ballistic behavior superior to the one of the one-layer plates consisting of any of the individual alloys mentioned for the said composite plate. However, said composite plate suffers from severe limitations of use when its front layer is prepared from Al-Zn-Mg-Cu alloys with a very high mechanical strength (types 7075 and 7178) in relation to the unsatisfactory behavior of said alloys to welding, due to a high embrittlement degree of the welded joint.

On the other hand, even if the welding of the plates in question should be limited to their inner layer (independently of the presence of not of Cu in the alloy forming said layer), the thickness considered for said layer would be insufficient to ensure welded joints having a satisfactory mechanical strength, and furthermore, should the alloy having the above-cited preferred composition be utilized for the front layer, then it would be possible, on one side, to effect a whole thickness welding of the composite two-layer plate, but, on the other side, serious problems of resistance to stress corrosion cracking would arise, in particular in the jointing area, due to the high content, in said preferred alloy, of the percentage of Mg and of the percentage of Zn+Mg. Such drawbacks imputable to stress corrosion could be reduced by subjecting said material to very severe ageing treatments, which, however, would result in an excessive worsening of the mechanical properties, and by consequence of the ballistic resistance of the plate.

SUMMARY OF THE INVENTION

It is an object of the present invention to provide plates formed of aluminium alloys, having high characteristics of resistance to dynamic penetration by conventional and disruptive projectiles and to spalling, free from the drawbacks mentioned hereinbefore, and therefore suitable for use in armor production, in particular for civil and military armored vehicles.

It is another object of this invention to provide aluminium alloy plates, susceptible of being efficaciously assembled by means of welded joints.

Still another object of the present invention is the obtainment of the abovesaid plates with improved characteristics of resistance to stress corrosion cracking and to fatigue.

The above-mentioned and still other objects, which will more clearly appear to those skilled in the art from the detailed description and the examples given hereinafter, are achieved, according to the present invention, by "composite plates" comprising three layers (or "components") reciprocally superimposed and welded on their contact surfaces by hot rolling, one of said components (hereinafter referred to as "central component") being formed of an aluminium alloy belonging to 7000 series, selected from the quaternary Al-Zn-Mg-Cu alloys, endowed with high characteristics of mechanical strength and hardness, the other two components (one of which is the "outer" component, hereinafter referred to as "front component", and the other is the "inner" component, hereinafter referred to as "inner component") being made of aluminium alloys of group 7000, selected from the ternary Al-Zn-Mg and quaternary Al-Zn-Mg-Cu alloys, possessing medium strength and hardness, and high properties of toughness, easily weldable by usual welding procedures and exhibiting good characteristics of resistance to stress corrosion cracking and to fatigue, the "front component" having the essential task of pre-absorbing the projectile energy, while the "central component" has the essential task of resisting to the penetration by the projectiles slowed down by the front component, and the "inner component" has the specific spalling preventing function.

DETAILED DESCRIPTION OF THE INVENTION

Figure 1:
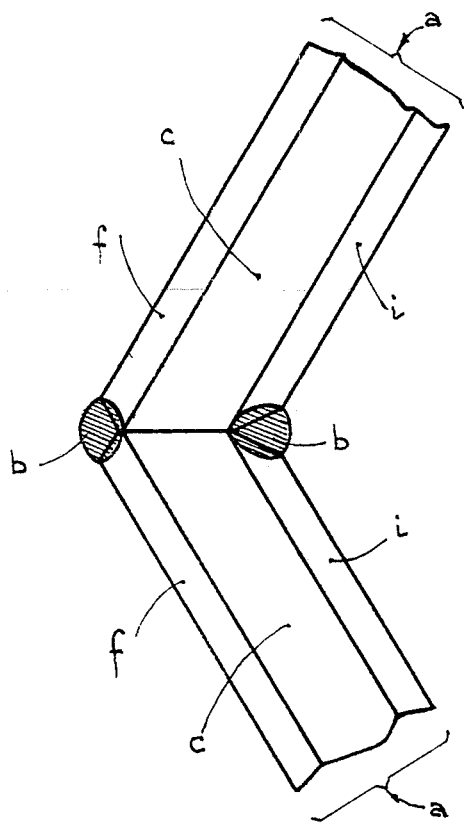

More in particular the abovesaid "composite plates" are obtained, according to this invention, by using and employing the aluminium alloy types, the jointing processes of said three "components", the thicknesses and the heat treatment hereinafter described and specified:

Aluminium alloy types: for the "front component" and for the "inner component" use is made of the alloys of 7000 series, easily weldable by the usual inert gas electric arc welding methods of the generally known types "T I G" ("Tungsten Insert Gas") and "M I G" ("Metal Inert Gas") (using, as filler metal, the known common Al-Mg and Al-Mg-Zn alloys), said alloys being preferably selected from among the ternary Al-Zn-Mg alloys because (other than other alloys such as, for example, the Al-Mg-Si ones) they possess, besides an easy weldability, also the important property of recovering, to a sensible extent, in the areas adjacent to the welded seams (heat affected zones) the mechanical characteristics decayed in consequence of the welding overheating. Said recovery property has positive consequences for a good ballistic behavior also in the welded areas.

The aforesaid alloys of group 7000 contain, beside Al, as already mentioned, the following amounts of main alloying elements: from 3 to 7% of Zn; from 0.5 to 3% of Mg and from 0 to 0.5% of Cu, the Cu amount being preferably within the range of from 0.10 to 0.18% to get the best compromise between good weldability properties (which would be worsened by a high Cu content) and good mechanical characteristics, also improving the stress corrosion resistance.

Besides the above-cited main alloying elements, said alloys contain also from 0.25 to 1% of addition elements, such as Mn, Cr, Zr and Ti, which exert a positive influence on some physical-mechanical and technological properties as well as on the ballistic behavior of said "front" and "inner" components.

For the "central component" there are utilized Al-Zn-Mg-Cu alloys containing from 5 to 10% of Zn, from 1.5 to 3.5% of Mg, from 0.8 to 2.5% of Cu and lesser amounts—ranging from 0.25 to 1%—of addition elements selected from among Mn, Cr, Zr and Ti. Among the aluminium alloys, said alloys are the ones which possess the highest mechanical strength and hardness characteristics, while their weldability is generally lower than the weldability of the first mentioned alloys used for the other two ("front" and "inner") "components".

For all the alloys utilized in the three abovesaid "components" of the "composite plate", the content of Fe and Si impurities shall not exceed 0.30% and 0.25% respectively, as said elements adversely affect the fracture toughness. It is preferable, especially for the alloys forming the "inner" and "central" components, to maintain the Fe and Si contents at levels of the order respectively of 0.10–0.15% and 0.05–0.10%. The tensile strength values of said alloys—after having subjected them to the complete heat treatment described later on therein—are comprised in the following ranges: 345–540 $N/mm^2$ for the "front component", 540–735 $N/mm^2$ for the "central component" and 290–520 $N/mm^2$ for the "inner component".

The choice of said alloys among the types specified hereinbefore for the three "components" must meet—on the basis of the knowledges of a technician skilled in the art—the requirement that the alloys should efficaciously respond to a same heat treatment, in relation to the fact that said treatment is to be applied to the composite plate.

The alloys previously indicated as the most suitable for said three "components" fully meet the above-cited requirement, particularly when the thermal treatment consists of a cycle comprising solution heat-treatment, quenching and artificial ageing, as specified more in detail later on herein.

In this connection, in the particular case of the "central component", the choice of the Al-Zn-Mg-Cu alloys for said "component" is preferably made from those containing, as addition elements, Zr and Mn, as said alloys exhibit a leaser worsening of the physical-mechanical properties, due to the welding operation, than that occurring in other alloys of the same type more usually employed, containing Cr as main addition element (for example 7075 and 7178).

"Jointing" or "Welding" process between the three "components" constituting the "composite plate": said jointing is carried out by means of known processes, such as for example hot rolling or explosive welding. In the case of hot rolling, "jointing" may be effected by direct reciprocal contact between the three "components" or better, and therefore preferably, by precladding—according to conventional cladding-by-rolling techniques—the said three "components" at one or both respective contact surfaces of the "components" themselves in the "composite plate", utilizing for said cladding sheets of aluminium (title from 99.0 to 99.99%, for example Al 1200 title 99.0% and Al 1050 A, title 99.5%) or sheets of aluminium binary alloys (for example of type Al-Zr and Al-Mn, such as alloy 3103 at 1.2% Mn), which are usually utilized in the cladding of light alloys, or sheets of more complex alloys with low contents of alloying elements, for example of type Al-Mn-Si and Al-Mn-Zr, such as the experimental alloy containing 0.8% Mn and 0.15% Zr.

The thickness of the layer of said cladding on each precladded surface must be of the order of from 0.5 to 3% of the thickness of the corresponding individual "component", and in any case the total thickness of said cladding layers shall not exceed by more than 5% the total thickness of the "composite plate".

More in detail, the above-mentioned "jointing" of the three "components" intended for forming the "composite plate" by hot rolling is effected as follows: at first the "pack" consisting of the three "components" (preferably precladded as explained hereinbefore) is preheated in a controlled atmosphere, preferably under vacuum (at temperatures generally comprised between 300° and 480° C.), whereupon said pack is hot rolled taking care that the first passes through the rolling mill should cause slight thickness reductions, while the successive rolling passes on the so pre-formed "composite plate" may cause more sensible thickness reductions, till obtaining the desired final thickness.

The total thickness reduction attained during said hot rolling process shall not be lower than 40%, preferably higher than 50%.

Thicknesses: according to the present invention, the total thickness of the "composite plates" object of the invention is in the range of from 10 to 100 mm, the thicknesses of the three individual "components" forming said "composite plates" being comprised within the following ranges of values expressed as % of the total thickness of the "composite plates": "front component": 19-32.5%; "central component": 35-62%; "inner component": 19-32.5%; finally, the total thickness of the metal or cladding alloy intermediate layers ranges from 0 to 5%.

Heat treatment: the heat treatment which the "composite plates" object of this invention are subjected to is carried out according to known processes and consists of a complete cycle of "solution heat-treatment—quenching—artificial aging". More particularly, for said heat treatment the solution temperatures range from 350° to 530° C., the soaking time being comprised between 30 minutes and 5 hours; the artificial ageing is effected in a single step (isothermal) at 120°-180° C. for times varying from 4 to 48 hours, or in two consecutive steps (di-isothermal), namely the first step at 90°-120° C. for 6-15 hours and the second at 125°-190° C. for 3-30 hours.

The delay time at room temperature between quenching (carried out according to conventional methods) and artificial ageing exerts a positive influence on the mechanical strength and may represent a factor of the utmost importance in the case of the isothermal ageing (single-step), while it plays a role of moderate importance in the case of the di-isothermal aging (two steps).

The "composite plates" as the ones described hereinabove according to the present invention have a resistance to penetration by projectiles of little caliber arms and by splits of disruptive projectiles and a resistance to spalling which are higher (the weight being equal for surface unit, and the thickness being substantially equal) than the resistance of the homogeneous single-layer plates manufactured at present on industrial scale, formed of Al-Zn-Mg alloys, in particular of alloys 7020, 7017 (derived from alloy 7039) and 7039, which are widely used in Europe, United Kingdom and U.S.A. respectively for the construction of armors for the armored vehicles of recentest design.

The aforesaid higher ballistic properties are a consequence of the specific geometrical-mechanical structure and of the chemical-structural characteristics of the plates object of the present invention, in particular since the action carried out by the "front component" is that of pre-absorbing the projectile energy, wherefore such action facilitates the function of the "central component", which is that of preventing or in case hindering the penetration by the projectile, the "inner component" having specifically the function of avoiding spalling.

Said compositions and structures of the "composite plates" in question permit furthermore to easily effect mechanically and ballistically very resistant jointing of such plates through welding and to impart to the aggregate of said plates, assembled in the armored vehicles, high features of resistance to fatigue and to stress corrosion.

Brief Description of FIG. 1: FIG. 1 discloses a composite according to the invention.

Of particular importance for the applications of the "composite plates" object of the present invention are the good weldability characteristics of the plates, substantially connected with the chemical composition of the alloys forming respectively the "front component" and the "inner component", and with the functional geometry of the welded jointing, as results, by way of example, from FIG. 1, which shows two "composite plates" welded by the inert-gas electric arc process and in which letters "a", "b", "f", "c" and "i" have the following meanings:

letter "a" indicates the two "composite plates";
letter "b" indicates the two welding jointings;
letters "f", "c" and "i" respectively indicate the "front", "central" and "inner" components of the two "composite plates".

With a view to better pointing out the advantages offered by the "composite plates" object of this invention is respect of known "plates" examples of some embodiments of said "plates", compared with single-layer plates and with a two-layer plate are described hereinafter with reference to what already illustrated and specified hereinbefore. Said examples are given for illustrating the present invention, without being however a limitation thereof.

EXAMPLE 1

In this example, "single-layer plates" of conventional type and "composite plates" according to the present invention are described and compared, the data and technical information relating to said plates being given at first and the data and results of ballistic tests carried out on said plates being given successively.

"Single-layer plates" of three known types (numbered from 1 to 3) and "composite plates" according to this invention of seven different types (numbered from 4 to 10) are constructed.

The aluminium alloys used for the aforesaid types of "plates" and the corresponding chemical compositions and mechanical characteristics are indicated in Table 1.

In said Table use is made of generally known symbols and items and, for what is lesser known or abbreviated, the following meanings are specified:

Front comp.="front component";
Cent. comp.="central component";
Inner comp.="inner component";
Rm=ultimate tensile strength, expressed in N/mm$^2$;
Rp(0.2)=yield strength, expressed in N/mm$^2$;
A$_5$%=percentage elongation, measured on a base of length Lo=5.65×√So, wherein So is the resistant section of the test specimen;
HB=Brinell Hardness determined under the following test conditions: ball diameter=2.5 mm; applicated load=613 Newton; load application time=15 seconds;
Alloy Cp 41-S-T6=commercial alloy produce by "ALLUMINIO ITALIA" (equivalent to alloy 7017);
Zergal 3 and Zergal 8=commercial names of alloys produced by "ALLUMINIO ITALIA", the former of which is equivalent to alloy 7010 and the latter is an experimental type.

resulting "composite plates", along with the single-layer plates of types Nos. 2 and 3, are subjected to a

TABLE 1

| Types of plate | Alloys forming the plates or the individual components | Nominal composition of alloys | | | | Mechanical characteristics | | | |
|---|---|---|---|---|---|---|---|---|---|
| | | Zn % | Mg % | Cu % | Addition elements % (total) | Rm N/mm$^2$ | Rp(0,2) N/mm$^2$ | A$_5$ % | HB |
| No. 1 sing. layer | 5083 - H115 | — | 4.5 | — | 0.85 | 350 | 270 | 12 | 85 |
| No. 2 sing. layer | 7020 - T6 | 4.5 | 1.2 | — | 0.55 | 362 | 308 | 17.3 | 119 |
| No. 3 sing. layer | Cp 41-S-T6 | 5.2 | 2.1 | 0.13 | 0.55 | 517 | 484 | 11.9 | 165 |
| No. 4 composite | Front comp.: 7020-T6 | 4.5 | 1.2 | — | 0.55 | 345 | 271 | 15.5 | 100 |
| | Centr. comp.: 7012-T6 | 6.0 | 2.0 | 1.0 | 0.28 | 563 | 503 | 12.5 | 170 |
| | Inner comp.: 7020-T6 | 4.5 | 1.2 | — | 0.55 | 345 | 271 | 15.5 | 100 |
| No. 5 composite | Front comp.: 7020-T6 | 4.5 | 1.2 | — | 0.55 | 345 | 276 | 15.3 | 103 |
| | Centr. comp.: 7012-T6 | 6.0 | 2.0 | 1.0 | 0.28 | 548 | 501 | 12.2 | 166 |
| | Inner comp.: 7020-T6 | 4.5 | 1.2 | — | 0.55 | 345 | 276 | 15.3 | 103 |
| No. 6 composite | Front comp.: Cp41-S-T6 | 5.2 | 2.1 | 0.13 | 0.55 | 517 | 484 | 11.9 | 165 |
| | Centr. comp.: 7012-T6 | 6.0 | 2.0 | 1.0 | 0.28 | 563 | 503 | 12.5 | 170 |
| | Inner comp.: 7020-T6 | 4.5 | 1.2 | — | 0.55 | 345 | 271 | 15.5 | 100 |
| No. 7 composite | Front comp.: Cp41-S-T6 | 5.2 | 2.1 | 0.13 | 0.55 | 517 | 484 | 11.9 | 165 |
| | Centr. comp.: Zorgal3-T6 | 6.2 | 2.3 | 1.8 | 0.28 | 634 | 568 | 11.2 | 190 |
| | Inner comp.: 7020-T6 | 4.5 | 1.2 | — | 0.55 | 345 | 271 | 15.5 | 100 |
| No. 8 composite | Front comp.: Cp41-S-T6 | 5.2 | 2.1 | 0.13 | 0.55 | 517 | 484 | 11.9 | 165 |
| | Centr. comp.: 7050-T6 | 6.2 | 2.2 | 2.3 | 0.13 | 622 | 549 | 11.3 | 187 |
| | Inner comp.: 7020-T6 | 4.5 | 1.2 | — | 0.55 | 345 | 271 | 15.5 | 100 |
| No. 9 composite | Front comp.: Cp41-S-T6 | 5.2 | 2.1 | 0.13 | 0.55 | 517 | 484 | 11.9 | 165 |
| | Centr. comp.: 7001-T6 | 7.4 | 3.0 | 2.1 | 0.22 | 663 | 606 | 7.5 | 194 |
| | Inner comp.: 7020-T6 | 4.5 | 1.2 | — | 0.55 | 345 | 271 | 15.5 | 100 |
| No. 10 composite | Front comp.: Cp41-S-T6 | 5.2 | 2.1 | 0.13 | 0.55 | 517 | 484 | 11.9 | 165 |
| | Centr. comp.: Zorgal8-T6 | 8.0 | 2.0 | 2.0 | 0.28 | 667 | 608 | 12.0 | 195 |
| | Inner comp.: Cp41-S-T6 | 5.2 | 2.1 | 0.13 | 0.55 | 517 | 484 | 11.9 | 165 |

As results from said Table, the "single-layer plates" numbered from 1 to 3 are formed respectively of alloys 5083, 7020 and Cp 41-S, which at present are the most utilized for armors of armored vehicles.

In particular, alloy Cp 41-S is the weldable alloy type Al-Zn-Mg having the highest mechanical strength commercially available at present. For such alloy the combination of Zn and Mg contents represents practically the highest limit above which the characteristics of toughness and of resistance to stress corrosion cracking of the plates excessively decay.

The above-said "single-layer plates" are obtained according to known methods and, except of alloy 5083 (producted in the known typical state H 115, since it is a strain hardening alloy) are subjected to the same solution heat-treatment, quenching and ageing of the "composite plates" hereafter described, which ensures for all said plates optimum characteristics of mechanical strength and hardness.

The "composite plates" numbered from 4 to 10—formed of alloys of types Al-Zn-Mg and Al-Zn-Mg-Cu—are obtained by jointing the three "components"—reciprocally superimposed and contacting—i.e. the "front", "central" and "inner" components, by hot rolling their "pack" after a preheating of said "pack" in a controlled atmosphere furnace at a temperature of from 400° to 420° C. for about 2 hours of soaking.

Prior to the cited preheating and rolling operations, said "components" are pre-cladded, according to the known hot rolling process, on the respective contact surfaces (both surfaces for the "central component" and one surface only for each of the other two "components", respectively the "front" and the "inner" component), using a sheet of aluminium 1050 A (title 99.5), with the exception of "plate" type No. 5, for which a sheet of alloy 3103 (1.2% Mn) is used.

The successive joining of the three pre-cladded "components" forming the "composite plate" is carried out by hot rolling, as explained hereinbefore, effecting, during the whole rolling cycle, a total thickness reduction of about 50%. After the aforesaid joining step, the resulting "composite plates", along with the single-layer plates of types Nos. 2 and 3, are subjected to a conventional heat treatment (T6) comprising a solution heat-treatment at a temperature of 450°–490° C., for about 2 hours of soaking, a quenching in water at room temperature, and ultimately an artificial di-isothermal ageing (started about 48 hours after said quenching) with a first step at 100°–105° C. for about 9 hours and with a second step at 130°–135° C. for about 24 hours, the latter step ensuring to all the alloys forming said plates the attainment of optimum values of the mechanical strength and hardness characteristics.

Said "single-layer" and "composite" plates are obtained with different total thicknesses, and more precisely, ranging from 20 to 30 mm. For the "composite plates" so obtained, the "front", "central" and "inner" components and the cladding layers have respectively the following thicknesses expressed in % of the total thickness: 28.5–29.5%; 38.5–40%; 28.5–29.5% and 2.5–3% (in the aggregate).

All the abovesaid "plates", both of the known "single-layer" type and of the "composite" type according to the present invention are subjected to known conventional ballistic tests, employing the following fire conditions:

projectile: conventional caliber 7.62 mm,
charge: ("standard") NATO type,
fire distance: 30 m;
projectile impact velocity: 835±15 m/sec.

In said tests under the above-mentioned fire conditions, the following characteristics are determined (or calculated):

the angle of attack of complete penetration ("critical angle") on "plates" with a total thickness of 20 mm (said angle represents the value of the projectile trajectory inclination angle—in respect of the line normal to the "plane" of the plate hit by said projectile—for higher values thereof no penetration of the plate occurs);

the thickness of complete penetration ("critical thickness") of the "plates" for a fixed angle of attack equal to 0°, i.e. with a projectile trajectory normal to the plate;

said thickness is determined by using, for the tests, plates having a total thickness of from 20 to 30 mm;

the weight per surface unit expressed in kgf/m² or (N/m²) of "plate" corresponding to said thickness of complete penetration ("critical thickness");

the "tendency to spalling" on the surface opposite to the projectile impact surface, namely the tendency of the "inner component" material to give place to detaching of its splits. Said characteristics are recorded on Table 2, from which the following is apparent:

the "composite plates" according to the present invention show a better ballistic behavior (valued on the basis of the resistance to penetration by the projectile and of the tendency to spalling) than the "single-layer plates" of the known type;

said better ballistic behavior is particularly evident for the "composite plates" No. 9 and No. 10 as compared with the "single-layer plate" of the known type No. 1 formed of alloy 5083-H 115, as there is a reduction of the "critical angle" by 15°–17° and a decrease of the "critical thickness" by 5.2–5.5 mm, what results in a reduction of weight for plate surface unit equal to 18.9–20%;

the "single-layer plate" No. 3 made of alloy Cp 41-S-T6 (equivalent to alloy 7017-T6) exhibits, against a better resistance to penetration in respect to the "single-layer plates" No. 1 (alloy 5083-H 115) and No. 2 (alloy 7020-T6), a strong tendency to spalling, as defined hereinbefore, such tendency occurring both in the case of total piercing and in the case of partial piercing of the plate: this fact suggests that alloy CP 41-S-T6 is not suited to be utilized in "single-layer plates" of high thickness, at least in the structural state of maximum mechanical strength, as exemplified.

EXAMPLE 2

A "two-layer composite plate" of known type consisting of a "front component" and of an "inner component" (of the type described in U.S. Pat. No. 3,649,227 cited hereinbefore), indicated with No. 11, is described in this example in order to compare its ballistic characteristics with the ones of the three-component "composite plates" Nos. 7,8,9 and 10 according to this invention already described in example 1 and relevent in Tables 1 and 2.

TABLE 2

| Type of plate | "Critical angle" for "plates" with total thickness of 20 mm | "Critical thickness" for an attack angle of 0° (mm) | Weight for surface unit of the "plate" with thickness corresponding to the "critical thickness" | | Tendency to spalling |
|---|---|---|---|---|---|
| | | | (kgf/m²) | (N/m²) | |
| No. 1 | 43° | 27.5 | 74.25 | 728.1 | none |
| No. 2 | 39° | 25 | 67.5 | 661.9 | low |
| No. 3 | 36° | 24 | 65 | 637.4 | remarked |
| No. 4 | 35° | 23.7 | 64 | 627.6 | none |
| No. 5 | 34° | 23.6 | 63.72 | 624.8 | none |
| No. 6 | 32° | 23.3 | 62.91 | 616.9 | none |
| No. 7 | 29° | 22.5 | 60.75 | 595.7 | none |
| No. 8 | 29° | 22.5 | 60.75 | 595.7 | none |
| No. 9 | 28° | 22.3 | 60.21 | 590.4 | none |
| No. 10 | 26° | 22 | 59.4 | 582.5 | none |

Said "two-layer composite plate" is obtained (through mechanical and thermal processes analogous with the ones employed for the abovesaid "three-component composite plates") with total thicknesses in the range of from 20 to 30 mm; the "inner component" of the plate has a thickness equal to 9–10% of the total thickness, the cladding layers having a (total) thickness equal to about 3% of the whole thickness.

The chemical compositions and the mechanical characteristics of the alloys forming the two "front" and "inner" components of said "two-layer composite plate" (subjected to heat treatment T6 similar to the one employed for the "three-component composite plates"), are indicated in Table 3. In accordance with what is disclosed in the aforecited patent, the type of alloy employed for the "front component" was selected according to the principle of ensuring for said component the highest characteristics of mechanical strength consistently with the possibility of joining the component itself by means of welding, while the type of alloy forming the "inner component" was selected according to the criterion of ensuring, besides good weldability properties, also high toughness characteristics.

Said "two-layer composite plate" was subjected to the same ballistic tests of example 1, and the relevant results are recorded on Table 4, wherefrom—by comparison with Table 2—the better ballistic behavior of "composite plates" Nos. 7,8,9 and 10 (in particular Nos. 9 and 10) according to the present invention may be inferred.

TABLE 3

| Type of "plate" | Alloys forming the Individual "components" | Nominal composition of alloys | | | | Mechanical characterisitcs | | | |
|---|---|---|---|---|---|---|---|---|---|
| | | Zn % | Mg % | Cu % | Addition elements % (total) | Rm N/mm² | Rp(0.2) N/mm² | A₅ % | HB |
| No. 11 two-layer | Front comp. - T6 | 6.2 | 2.5 | 0.12 | 0.30 | 560 | 520 | 9 | 172 |
| | Inner comp. - T6 | 5.0 | 1.0 | — | 0.50 | 378 | 310 | 14 | 121 |

TABLE 4

| Type of plate | "Critical angle" for "plates" with total thickness of 20 mm | "Critical thickness" for an attack angle of 0° (mm) | Weight for surface unit of the "plate" with thickness corresponding to the "critical thickness" | | Tendency to spalling |
| --- | --- | --- | --- | --- | --- |
| | | | (kgf/m$^2$) | (N/m$^2$) | |
| No. 11 | 33 | 23.5 | 63.5 | 622.2 | none |

It has to be pointed out that "two-layer composite plate" No. 11, although exhibiting an improved ballistic behavoir as compared with "single-layer plate" No. 3 formed of alloy Cp 41-S-T6 (Tables 1 and 2), presents—due to the reasons explained hereinbefore—some difficulties as regards industrial applications in consequence of the very high susceptibility to stress corrosion cracking of the "front component", particularly in its welded jointed areas, what can be obviated by employing very severe artificial ageing conditions, which, however, reduce the ballistic resistance of the assembled plate.

The "composite plates" according to the present invention described and exemplified hereinbefore, are susceptible of modifications and variations, which do all fall within the scope of this invention, and they may find important applications—besides in armored vehicles—in several other fields, both civil and military, for which light armors having high resistance characteristics of dynamic penetration by hard bodies are required.

Furthermore, said plates may have flat or curved shapes.

We claim:

1. A composite plate formed of solution heat treated, quenched and aged aluminum alloys, selected from the group consisting of Al-Zn-Mg and Al-Zn-Mg-Cu, having a thickness between 10 and 100 mm and suited to be used as an armor plate, which comprises:
   (a) a central alloy component possessing high hardness and mechanical strength and having a tensile strength ranging from 540 to 735 N/mm$^2$, said central alloy component comprising 5 to 10% Zn, 1.5 to 3.5% Mg, 0.8 to 2.5% Cu and 0.25 to 1% of at least one additional element selected from the group consisting of Mn, Cr, Zr and Ti, the balance to 100% consisting essentially of Al;
   (b) a front alloy component having good weldability and toughness properties and having a tensile strength between 345 and 540 N/mm$^2$, said front alloy component comprising 4 to 7% Zn, 1 to 3% Mg, 0 to 0.5% Cu, and 0.25 to 1% of at least one additional element selected from the group consisting of Mn, Cr, Zr and Ti, the balance to 100% consisting essentially of Al; and
   (c) an inner alloy component having good weldability and toughness properties having a tensile strength between 290 and 520 N/mm$^2$, said inner alloy component comprising 3 to 7% Zn, 0.5 to 3% Mg, 0 to 0.5% Cu and 0.25 to 1% of at least one additional element selected from the group consisting of Mn, Cr, Zr and Ti, the balance to 100% consisting essentially of Al, said front alloy component, and inner alloy components reciprocally contacting said central alloy component in a superimposed position and welded together on their respective surfaces said central alloy component being 35 to 62% of the total composite thickness.

2. The composite plate formed of aluminum alloys as defined in claim 6 in which,
   the central alloy component contains 6 to 8% Zn, 2 to 2.5% Mg, 1.7 to 2.3% Cu and 0.25 to 0.35% of Mn+Zr+Ti, the balance to 100% consisting essentially of Al;
   the front alloy component contains 5 to 6% Zn, 1.8 to 2.5% Mg, 0.10 to 0.15% Cu and 0.45 to 0.60% of Cr+Mn+Zr+Ti, the balance to 100% consisting essentially of Al; and
   the inner alloy component contains 4.5 to 5.5% Zn, 1 to 2% Mg, 0.10 to 0.15% Cu and 0.45 to 0.60% of Cr+Mn+Zr+Ti, the balance to 100% consisting essentially of Al.

3. The aluminum alloy composite defined in claim 1, in which the Fe and Si impurities contained in said aluminum alloys are respectively lower than 0.30% and 0.25%.

4. The aluminum alloy composite defined in claim 1 wherein said central alloy component has a thickness between 35% and 62% of the total thickness, wherein the front alloy component has a thickness between 19% and 32.5% of the total thickness and wherein the inner alloy component has a thickness between 19% and 32.5% of the total thickness.

* * * * *